United States Patent [19]
Patel

[11] Patent Number: 5,835,856
[45] Date of Patent: Nov. 10, 1998

[54] TRANSPORTING USER DEFINED BILLING DATA WITHIN A MOBILE TELECOMMUNICATIONS NETWORK

[75] Inventor: Mahesh Patel, Plano, Tex.

[73] Assignee: Ericsson Inc., Research Triangle Park, N.C.

[21] Appl. No.: 646,585

[22] Filed: May 8, 1996

[51] Int. Cl.⁶ .................................................. H04O 07/22
[52] U.S. Cl. .......................... 455/406; 379/119; 379/130
[58] Field of Search ..................................... 455/405, 406, 455/407, 408, 412; 379/111, 112–114, 120–121, 130–131, 140–141, 116

[56] References Cited

U.S. PATENT DOCUMENTS 5,241,586  8/1993  Wilson et al. .......................... 379/130
5,689,547  11/1997  Molne ........................................ 379/58

*Primary Examiner*—Wellington Chin
*Assistant Examiner*—Philip J. Sobutka
*Attorney, Agent, or Firm*—Jenkens & Gilchrist, P.C.

[57] ABSTRACT

User defined or entered text messages are transported from a mobile station to the serving mobile switching center (MSC) over a connection-less communications link. An application module within the serving MSC extracts the encapsulated user defined text messages from the received signal for forwarding to the associated billing center. The billing center, after consolidating the call data received by a Toll Ticket, produces billing statements containing the user defined text messages allowing mobile subscribers to better identify and keep record of each call.

20 Claims, 5 Drawing Sheets

TRANSPORTING USER DEFINED BILLING DATA WITHIN A MOBILE TELECOMMUNICATIONS NETWORK

BACKGROUND OF THE INVENTION

1. Technical Field of the Invention

The present invention relates to a mobile telecommunications system and, in particular, to the transportation of user defined text messages from a mobile station to a billing center.

2. Description of Related Art

With a conventional mobile telecommunications system, a number of different persons may use a single mobile station to generate multiple calls while incurring multiple charges to a single subscription. For example, each member within a family or business may use the same mobile station to utilize mobile service. A mobile subscriber may also charge to a single subscription while generating multiple calls having different purposes.

However, subsequently generated billing statements received by mobile subscribers do not contain adequate information to enable the mobile subscribers to readily ascertain the identity of each call. Each entry representing a single call within a normal billing statement may include the called party number, the calling party number, the time of the call, the duration of the call, the costs of the call, etc. However, with such system generated information, it is confusing and cumbersome for a mobile subscriber responsible for paying the bills to find out the purpose or identities of such calls. By the time the mobile subscriber receives the bill, the mobile subscriber may not remember who made the call, why that call was made, and for what purpose such a call was made.

There are a number of subscriber features provided by a conventional telecommunications network to alleviate some of the aforementioned problems. One such feature is the Subscriber Account Code feature. A subscriber enters a predesignated account code or numerical value before initiating a call toward a particular number. The serving telecommunications switch analyzes the received entered account code to determine the description associated with that particular account code. A database storing predesignated account codes with corresponding descriptions defined by the mobile subscriber is accordingly indexed. For example, the account code value of one stored in the database implies that this is a business call. The value of two implies that this is a personal call. Account codes can also be detailed enough to specify which client and matter is associated with a particular account code. However, the messages or comments allowed by the telecommunications switch is inherently limited to what is already stored in the database. Therefore, if the subscriber wishes to designate a new description or different description, the subscriber must first update the database contents stored in the serving telecommunications switch before such account codes are allowed to be used by the subscriber. The subscriber also cannot directly enter text descriptions for a particular call. Furthermore, such entered account codes are not handled transparently by the serving telecommunications system. The telecommunications system has to analyze the entered numerical code to determine the corresponding text or numerical messages for that particular call.

Accordingly, it would be advantageous to allow a mobile subscriber to freely enter subscriber defined text messages for a particular mobile call and have the serving mobile telecommunications system transparently handle entered text messages to be included as a part of the billing statements.

For example, such a system would enable a mobile subscriber to enter a text message such as "called Mr. Smith for the Dallas contract" and have the message printed along with other system generated information on the billing statements.

SUMMARY OF THE INVENTION

User defined text messages associated with a particular mobile call are encapsulated into a connection-less signal by a mobile station. The connection-less signal encapsulating the text messages is then transmitted from the mobile station to a mobile switching center (MSC) serving the mobile station. An application module within the serving MSC then extracts the encapsulated text messages for transporting to a billing center. The transported text messages are utilized by the billing center to generate more customized billing statements.

Such a connection-less signal may include an originating call setup request signal or an Unstructured Supplementary Service Data (USSD) message.

The application module may transport the user defined text message directly to the billing center after assigning a unique call identification number. Such a unique call identification number is later utilized by the billing center to consolidate the user defined text message with the rest of the billing records representing the particular call.

As another embodiment of the present invention, the application module within the serving MSC may forward the extracted text messages to a charging module responsible for generating Toll Tickets within the serving MSC. The charging module includes the forwarded text messages when generating the Toll Ticket for that particular call. The generated Toll Ticket storing the text messages is then transported to the billing center for customer billing purposes.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
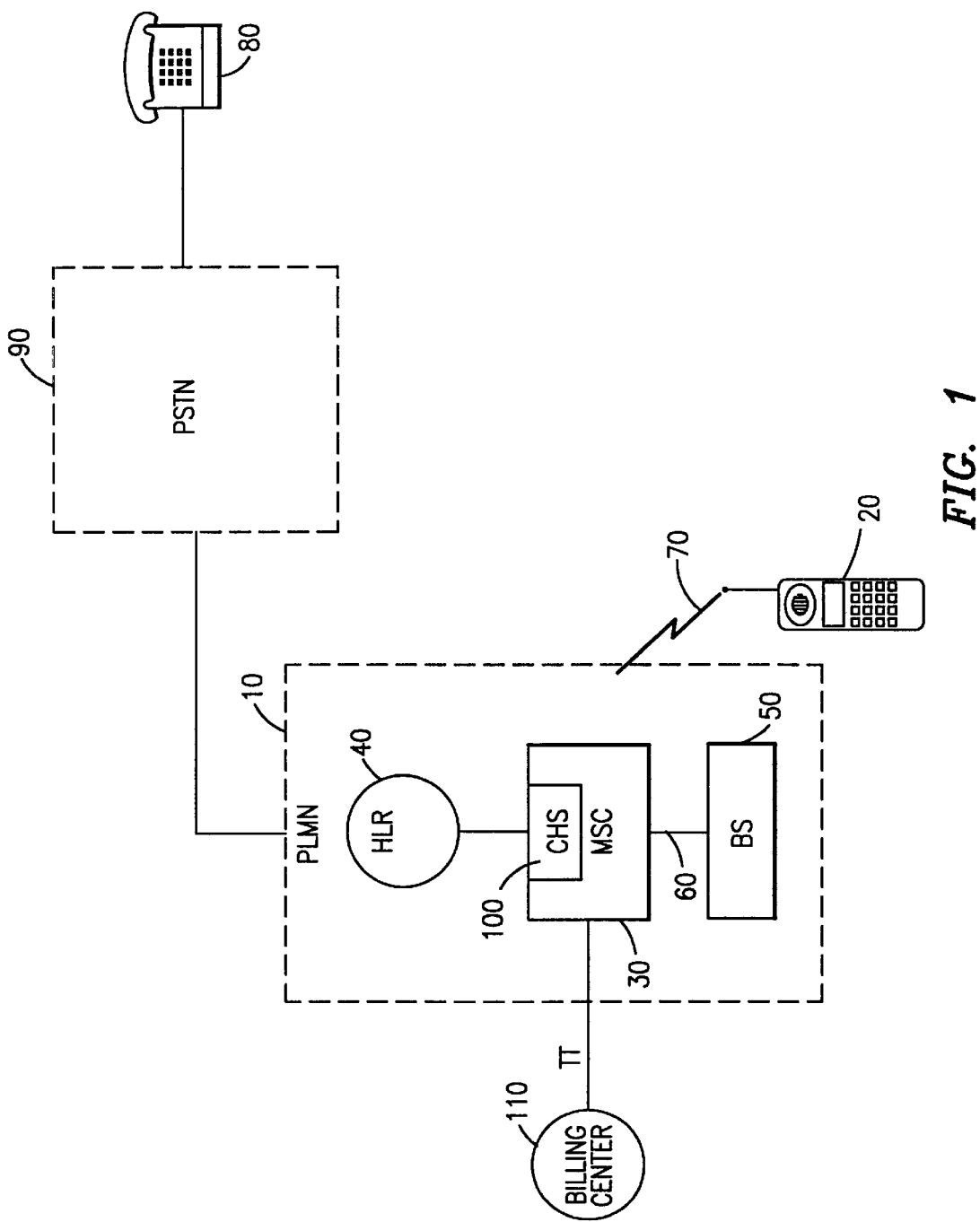
FIG. 1 is a block diagram illustrating the communication of billing records from a serving public land mobile network (PLMN) to a billing center for a particular mobile call.

FIG. 1 is a block diagram illustrating the communication of billing records from a serving public land mobile network (PLMN) 10 to a billing center 110 for a particular mobile call. The PLMN 10, which is used to communicate with a mobile station 20, comprises a mobile switching center (MSC) 30, a home location register (HLR) 40, a visiting location register (VLR, not shown in FIG. 1 but usually co-located with the MSC 30 and also collectively referred to as a MSC/VLR), and a base station (BS) 50. The BS 50 is connected to the MSC 30 using a digital communications link 60, and communicates with a mobile station 20 via a radio channel 70. The mobile station 20 further communicates with other subscribers, such as a wireline terminal 80, via a Public Switched Telephone Network (PSTN) 90.

A call from the mobile subscriber starts when the mobile subscriber first keys in the desired destination number or service code and then presses the send button. An access channel is seized, whereupon the mobile identity and the entered number are automatically transmitted to the MSC 30 via the BS 50. The MSC 30 retrieves the subscriber category information for the calling subscriber and verifies that the caller has access to the system. The keyed number is also analyzed to determine if the caller is allowed to call that particular number or to invoke that particular subscriber feature associated with the entered service code. If all analyses are affirmative, the mobile subscriber is assigned to an analog or digital voice channel 70 and the call is set up to a called subscriber such as the wireline terminal 80.

For charging purposes, a charging subsystem module (CHS) 100 within the serving MSC 30 monitors the call in progress and produces a Toll Ticket (TT, also known as Call Detail Record-CDR) when the call is terminated. The produced TT includes system generated information such as the duration of the call, the calling/called party number, the type of call, etc. Such produced TT is then transported to the billing center 110 for producing subscriber billing statements. The actual transportation from the serving MSC 30 to the billing center 110 can be accomplished in a number of different ways. Using a packet data network such as an X.25 network, the generated TTs can be communicated over to the billing center 110. Alternatively, the generated TTs can be stored on a magnetic tape and physically transported to the billing center 110. After receiving the generated TTs, the billing center 110 consolidates all TTs associated with each subscription, reformats the TT stored information, calculates the cost of each call in accordance with each subscription agreement, and generates billing statements for its subscribers. Such billing statements are then sent to the subscribers for charging purposes.

The billing statements received by the mobile subscribers only contain the above mentioned system defined information. With such limited information, it is later difficult to ascertain the identity or purpose of each call stated in the received billing statements. Also, because the subscriber cannot enter subscriber defined text messages for a particular call, the subscriber is not able to make notes or comments regarding the call.

With the introduction of the Global System for Mobile (GSM) communications or Personal Communications System (PCS), a number of new and advanced supplementary services are being provided to mobile subscribers. Since these supplementary services utilize user specified data, there are no structured ways to communicate these data between a Public Land Mobile Network (PLMN) application and a mobile station. As a result, a number of unstructured message protocols have been developed for the GSM or PCS environment. One such protocol is the Short Message Service (SMS) protocol for transporting information between a PLMN and a mobile station. Another protocol is Unstructured Supplementary Service Data (USSD) which has been introduced to enable user interaction between GSM PLMN applications and a mobile station in a transparent way through the mobile telecommunications network. It is transparent because neither the MSC nor the mobile station review or manipulate the contents of the messages being transported.

Accordingly, USSD or SMS is used when structured, functional signaling is not available for a supplementary service. The USSD protocol, for example, provides a transport mechanism for carrying unstructured data (e.g., user specified text data) to and from an application residing within a targeted mobile station. One example of such a supplementary service is when a message service center interfaces with a mobile telecommunications network for providing text information such as weather information or stock exchange information to mobile subscribers. When a mobile subscriber makes a request toward the message service center using a USSD message, the message service center provides the requested information back to the mobile terminal also via USSD messages.

Figure 2:
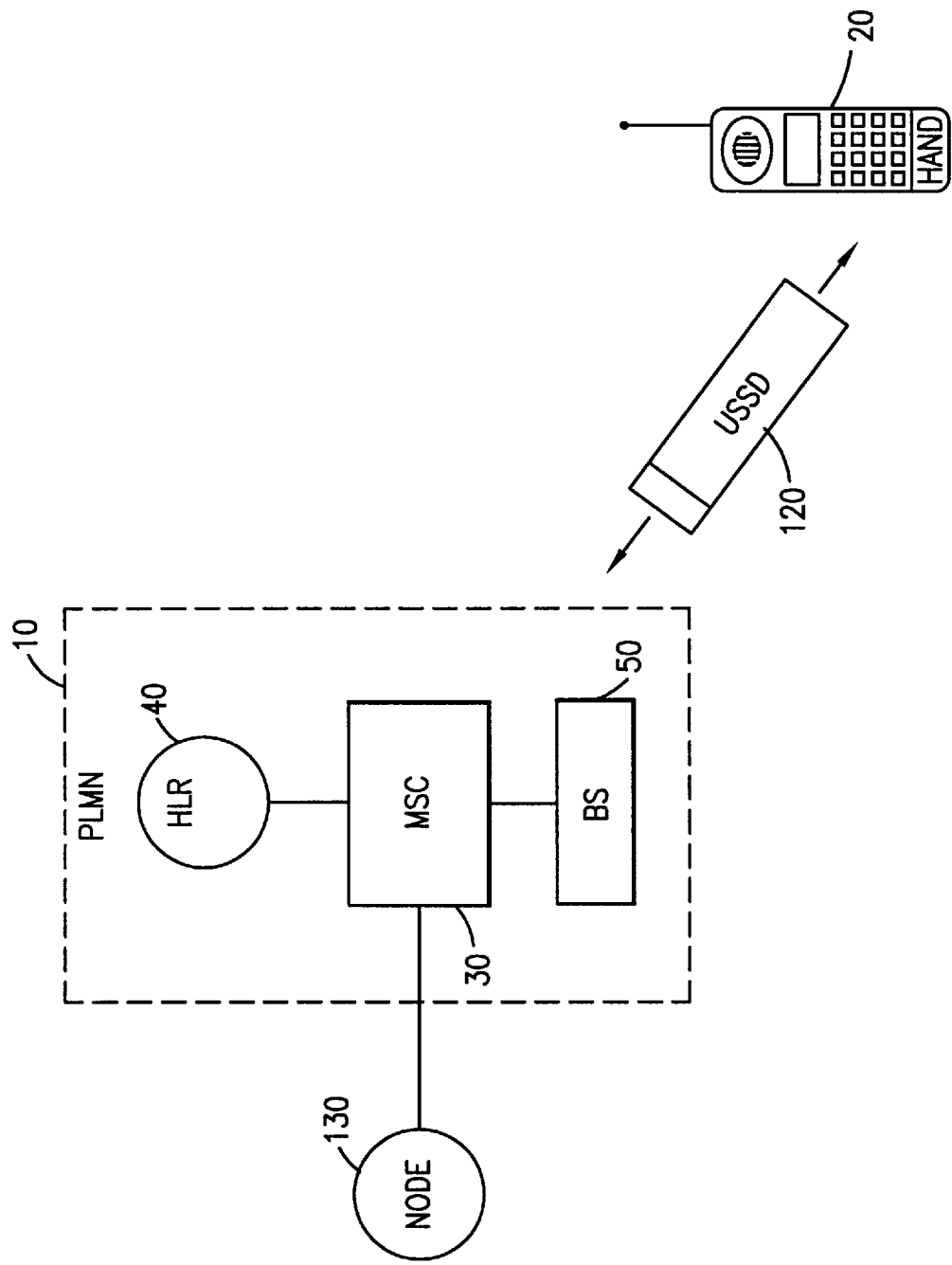
FIG. 2 is a block diagram illustrating the communication of an Unstructured Supplementary Service Data (USSD) message between a mobile station and a serving PLMN.

Reference is now made to FIG. 2 where a block diagram illustrating the communication of a USSD message 120 between the mobile station 20 and the serving PLMN 10 is shown. An external node user 130 where a particular application module resides is responsible for the interaction (signaling procedures) towards the mobile station 20. The dialogue between the external node user 130 and the mobile station 20 is performed without the conversion of USSD components by the HLR 40, the BS 50, or the MSC 30 serving the mobile station 20. In other words, the HLR 40, the BS 50, and the MSC 30 only relay the USSD components between the concerned participants in the above dialogue (the external node user 130 and the mobile station 20 for this particular case) without modification. Such an external node user may include a weather information center and stock market information provider in accordance with the examples described above.

Figure 3:
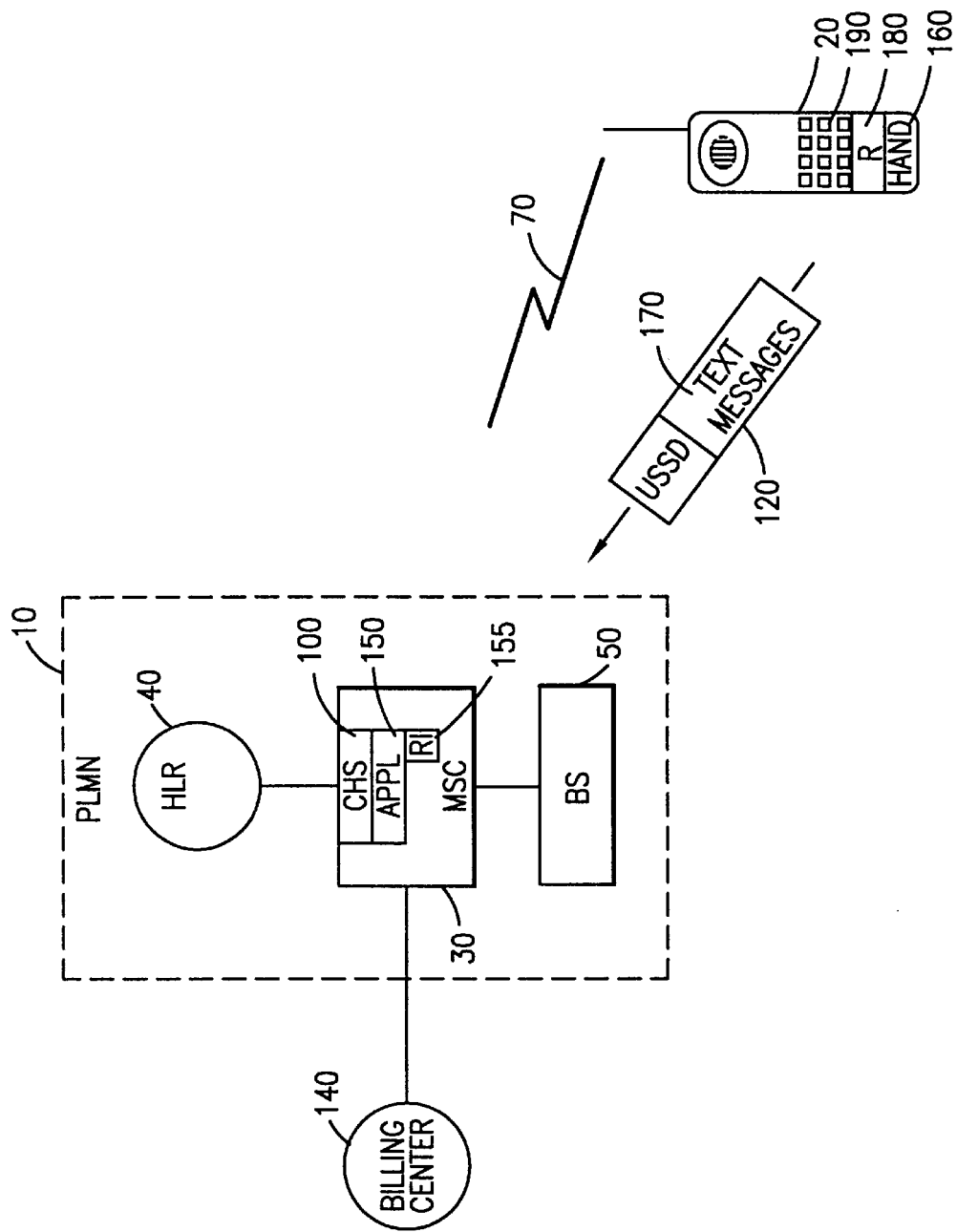
FIG. 3 is a block diagram illustrating the communication of a USSD message encapsulating user defined text messages from a mobile station to a serving PLMN.

Reference is now made to FIG. 3 where a block diagram illustrating the communication of a USSD message 120 encapsulating user defined text messages 170 from the mobile station 20 to the serving PLMN 10 is shown in accordance with the teachings of the present invention. A text message handler (HAND) 160 within the mobile station 20 interacts with the mobile subscriber to receive subscriber defined text messages 170. Such an interaction can be accomplished by retrieving the subscriber entered text messages directly via an alphanumeric keypad 190 attached to the mobile station 20 or by retrieving the pre-stored subscriber entered text messages from a register (R) 180. Such a register 180 may be a Subscriber Identity Module (SIM) card attached to the mobile station 20. A mobile subscriber can program or store a number of different text messages into his SIM card and later retrieve the appropriate one from a mobile station displayed list. The retrieved subscriber defined text messages are then encapsulated into a USSD message 120 and transmitted to the serving PLMN 10 over a connection-less communications link such as a Stand-alone Dedicated Control Channel (SDCCH). Such a USSD message 120 encapsulating the user entered text messages can be transmitted during a particular call as illustrated by the radio link 70 or right after the call. The USSD message 120 also can be transmitted both during a call connection originated by the mobile station and a call connection terminated towards the mobile station.

The serving MSC 30 receives the transmitted USSD message via the PS 50 and determines that the received USSD message needs to be transparently forwarded to an application module (APPL) 150. The application module 150, which can be a USSD handler application module 150, extracts the user defined text messages 170 encapsulated in the USSD message 120 and determines the particular call the mobile station 20 is currently processing. After identifying the call, the application module 150 forwards the extracted text messages to the charging module (CHS) 100 for recordation. The charging module 100 monitors the call until the connection is terminated and generates a TT for charging purposes. The generated TT including the received text messages 170 is then transmitted to the billing center 140 using one of the transport mechanisms previously described. In accordance with the teachings of the present invention, the billing center 140 then generates billing statements containing the subscriber defined text messages. Such text messages can be utilized by the mobile subscriber to better identify the calls enumerated in the billing statements and to keep better record of each call for his personal or business purpose.

As another embodiment, instead of forwarding the received text messages to the charging subsystem module 100, the application module 150 transmits the text messages directly to the billing center 140. As soon as a particular call is terminated, the charging module 100 produces and transmits a corresponding TT representing the particular call. After producing the TT record, the charging subsystem module 100 no longer transmits additional information to the billing center 140 regarding that particular call. Therefore, if user defined text messages are received from the mobile station 20 after the call has been terminated, there is no need for the application module 150 to forward the received text messages to the charging subsystem module 100. Instead, the application module 100 needs to forward the user defined text messages directly to the billing center 140. To enable the billing center 140 to correlate and consolidate the user defined text messages received from the application module 150 with the corresponding TT received from the charging module 100, a unique identification number representing the particular call needs to be assigned by the serving MSC to both the text message and the TT. In accordance with the teachings of the present invention, the call-identification-number tag value currently being used by the MSC 30 to identify each call is utilized by the application module 150 to also identify the text messages being transmitted to the billing center 140. Utilizing the call-identification-number value, the billing center 140 properly correlates and consolidates the two received data and produces a single billing statement. Accordingly, a register (R1) 155 within the serving MSC 30 and accessible by the application module 150 contains the unique call identification number representing the last call that was utilized by the mobile station 20. Whenever the mobile station 20 transmits user defined text messages after a call has already been terminated, the application module 150 retrieves the unique call identification number stored in the R1 155 and assigns it to the received text messages. The assigned text messages are then forwarded to the billing center.

Figures 4, 6:
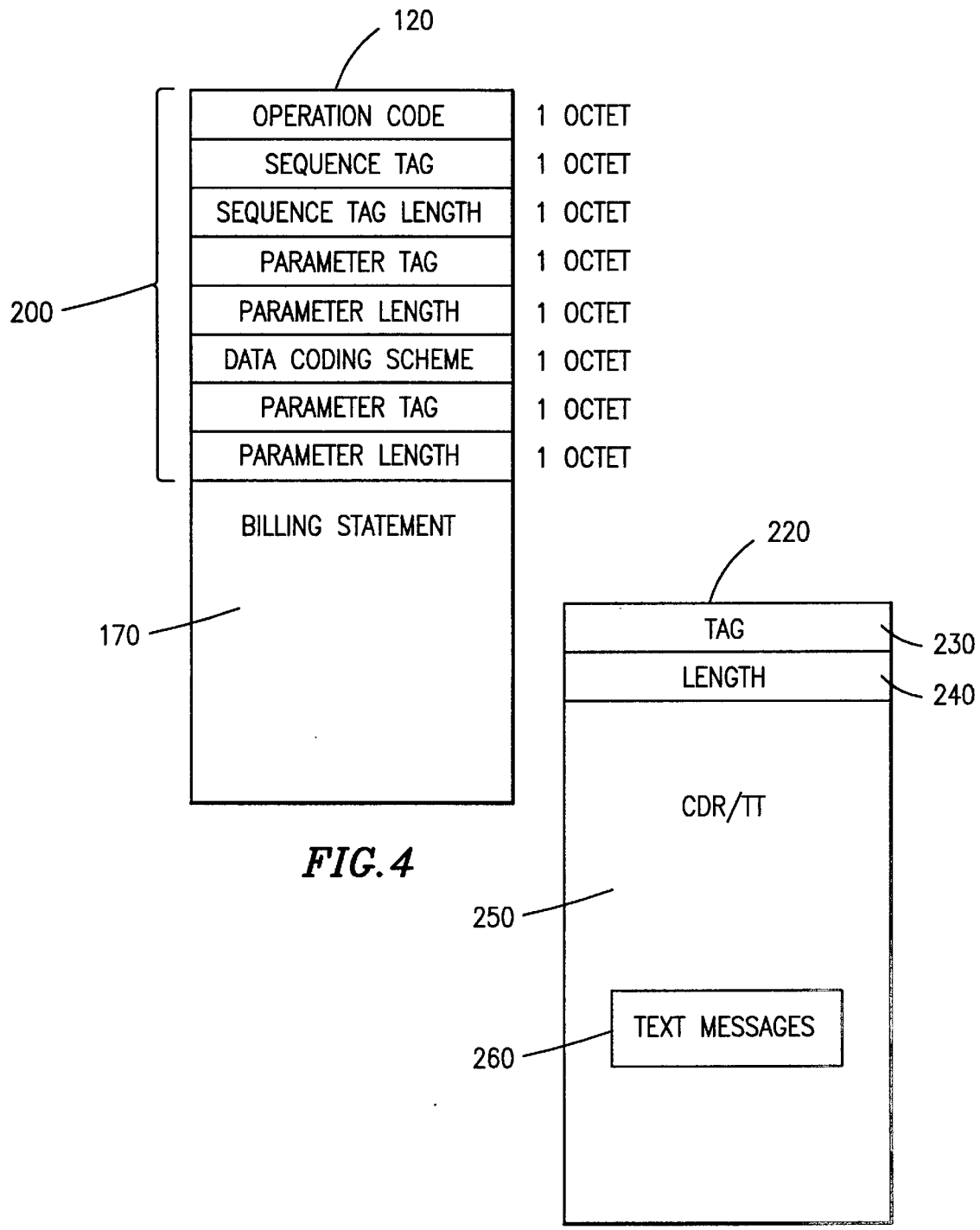
FIG. 4 illustrates the data format of a USSD message encapsulating user defined text messages.
FIG. 6 illustrates the data format of a Toll Ticket encapsulating user defined text messages.

FIG. 4 illustrates the data format of a USSD message 120 encapsulating user defined text messages 170. The USSD message 120 comprises a maximum of one hundred and sixty (160) octets. The first eight octets 200, if needed, can be used to specify which language, operation, parameter, data length, and data sequences are being used while the rest of the octets can be used to transport user defined text messages (character data). One of the parameters within the header 200 specifies that the application module 150 (see FIG. 3) needs to receive the transported text messages once it is delivered to the serving MSC. The application module 150 specified in the header information 200 then extracts the encapsulated text messages 170 from the received USSD message.

As another embodiment of the present invention, another connection-less signal such as a call setup request signal can be utilized to transport user defined text messages from the mobile station 20 to the serving PLMN 10. Whenever the mobile station 20 desires to make an outgoing call, the text message handler (HAND) 160 within the mobile station 20 retrieves the text messages from the mobile subscriber. As described previously, the text message handler 160 may retrieve the user defined text messages via the keypad 190 or from the storage register (R) 180. As the mobile station 20 transmits a call set up request signal via SDCCH to the MSC, the text message handler 160 encapsulates the retrieved text messages into the request signal. The serving MSC 30 within the PLMN 10 receives the call set up request signal via the BS 50 and performs the normal steps to process a call. Such steps include marking the mobile station "busy" in MSC/VLR, performing authentication procedure, ciphering equipment identification, and analyzing the transmitted B-number. After determining the call is allowed to be processed, the application module 150 is invoked to extract the user defined text messages encapsulated in the call setup request signal 210. The extracted text messages are handled in a manner similar to the handling of USSD messages encapsulating text messages as described in FIG. 3. Accordingly, the extracted text messages are either forwarded to the charging subsystem module 100 or to the billing center 140 directly.

For exemplary purposes, USSD and setup request signals are used to describe the transportation of a user entered text messages over a connection-less communications link from a mobile station to a MSC. However, as the system and method of the present invention are applicable to any type of connection-less communications link, such as SMS, USSD, setup request, and Direct Transfer Application Protocol (DTAP) based messages, it will be understood that the description of the present invention in the context of USSD or setup request messages herein is by way of explanation of the invention rather than of limitation of the scope of the invention.

Figure 5:
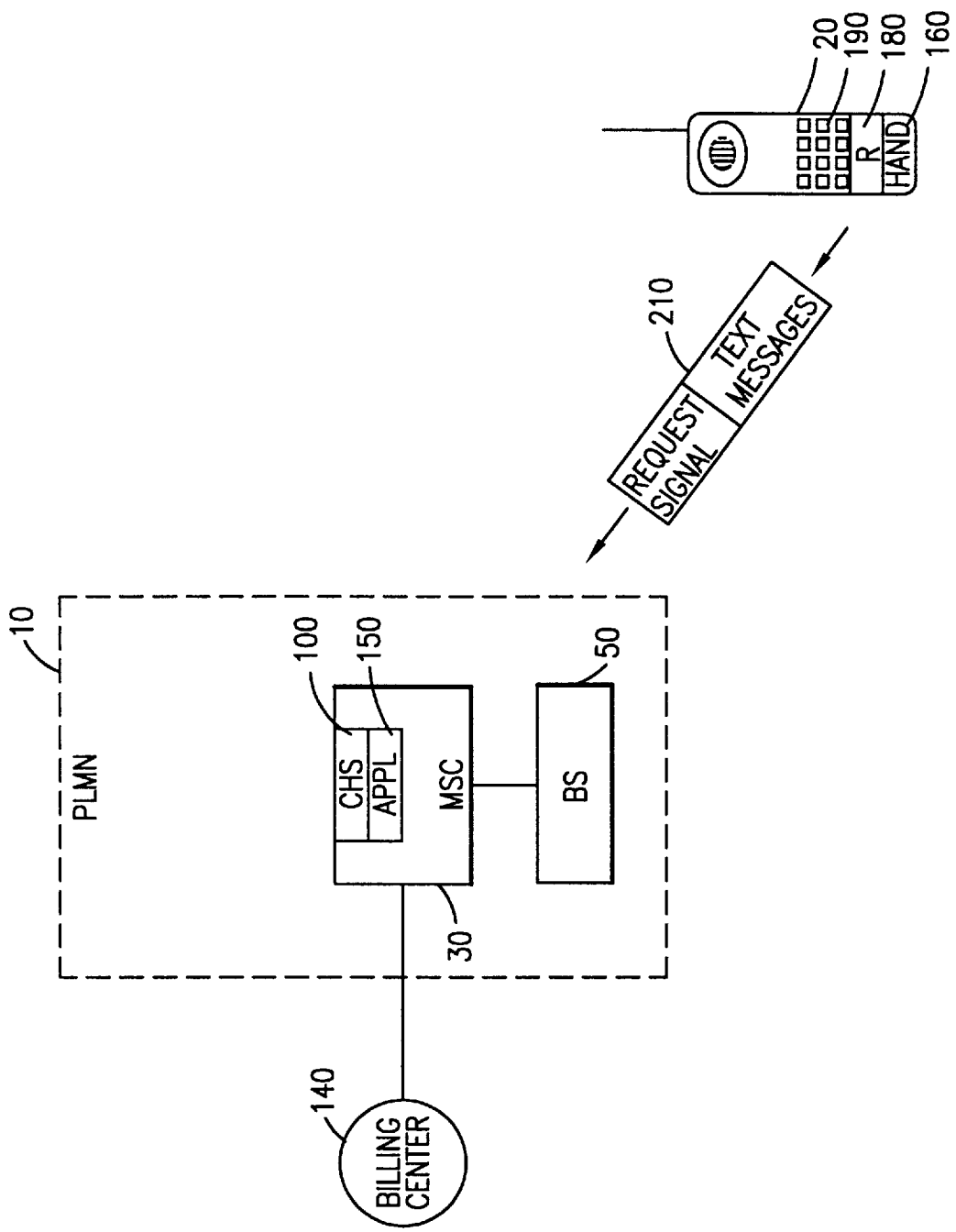
FIG. 5 is a block diagram illustrating the communication of a call setup request message encapsulating user defined text messages from a mobile station to a serving PLMN in accordance with the teachings of the present invention.

Reference is now made to FIG. 6 where the data format of a TT 220 encapsulating user defined text messages is shown. As described previously, after each call is terminated, the charging subsystem module (CHS) 100 (see FIG. 5) produces a TT for each call. The generated TT 220 includes header information indicating the identity and type of the call. One such tag or identity is the unique-call-identification-number tag assigned to each call by the mobile network for uniquely identifying the call. If user defined text messages are transmitted to the billing center directly from the application module within the serving MSC, the unique call identification number assigned to the TT is utilized by the billing center to correlate the two data. The length header 240 indicates how much data are encapsulated in the data section 250. The user defined text messages 260 are stored within the data section 250 as shown in FIG. 6. The billing center receives the transmitted TT, identifies the subscription to be charged, extracts the encapsulated text messages, and generates billing statements for charging purposes in accordance with the teachings of the present invention.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for communicating text messages between a mobile station and a billing center within a mobile telecommunications network for inclusion in a billing statement, said method comprising the steps of:

encapsulating mobile subscriber entered text messages into a connection-less signal, said text messages associated with a particular call;

transmitting said connection-less signal from said mobile station to a mobile switching center (MSC) serving said mobile station;

extracting said text messages encapsulated in said connection-less signal by said MSC;

transmitting said extracted text messages from said MSC to said billing center; and generating, by said billing center, said billing statement, said billing statement including said transmitted text messages for said particular call.

2. The method of claim 1 wherein said connection-less signal comprises an outgoing call setup request message.

3. The method of claim 1 wherein said connection-less signal comprises an Unstructured Supplementary Service Data (USSD) signal.

4. The method of claim 1 wherein said step of transmitting said extracted text messages further comprises the step of transmitting said extracted text messages using a Toll Ticket (TT).

5. The method of claim 1 further comprising the step of assigning a unique identification number representing said particular call to said extracted text messages and wherein said step of transmitting said connection-less signal comprises the step of transmitting said assigned unique identification number.

6. A system for communicating text messages associated with a particular call from a mobile station to a billing center for inclusion in a billing statement, said system comprising:

a mobile switching center (MSC) serving said mobile station;

a connection-less communications system for transporting said text messages from said mobile station to said MSC;

wherein said MSC comprises:

an application module for receiving said text messages transported over said connection-less communications system;

a charging module interfaced with said application module for generating a Toll Ticket (TT) representing said particular call, said TT storing said received text messages; and means for transporting said generated TT to said billing center, said billing center generating said billing statement using said generated TT, said billing statement including said text messages.

7. The system of claim 6 wherein said connection-less communications system comprises an outgoing call setup request signal encapsulating said text messages.

8. The system of claim 6 wherein said connection-less communications system comprises an Unstructured Supplementary Service Data (USSD) message transmitted over a control channel.

9. The system of claim 8 wherein said application module comprises a USSD handler application module.

10. A system for correlating text messages with a billing record representing a particular call, said system comprising:

a mobile station comprising a first application module, said first application module retrieving text messages for said particular call;

a mobile switching center (MSC) serving said mobile station;

a connection-less communications link connecting said mobile station with said MSC, said connection-less communications link transporting said text messages from said mobile station to said MSC; and wherein said MSC further comprises a second application module for retrieving said transported text message from said connection-less communications link and associating said retrieved text messages with said billing record representing said particular call.

11. The system of claim 10 wherein said first application module retrieves said text messages from a mobile subscriber via a keypad.

12. The system of claim 10 wherein said first application module retrieves said text messages from a memory register attached to said mobile station.

13. The system of claim 12 wherein said memory register comprises a Subscriber Identity Module (SIM) card.

14. The system of claim 10 wherein said connection-less communications link comprises a control channel transporting an Unstructured Supplementary Service Data (USSD) message.

15. The system of claim 10 wherein said connection-less communications link comprises a control channel transporting an outgoing call setup request message.

16. The system of claim 10 wherein said second application module associates said text message with said billing record by storing both said text message and said billing record into a Toll Ticket (TT).

17. The system of claim 10 wherein said second application module associates said text message with said billing record by assigning a unique identification number to both said text messages and said billing record.

18. A method within a mobile switching center (MSC) for generating a billing record containing user defined text messages for a particular call connection, said method comprising the steps of:

establishing a particular call connection with a mobile station;

receiving user defined text messages over a connection-less communications link from said mobile station, said user defined text messages associated with said particular call connection; and generating a billing record representing said particular call connection, said billing record storing said user defined text messages.

19. The method of claim 18 wherein said step of receiving said user defined text messages comprises the step of receiving a call setup request signal containing said user defined text messages.

20. The method of claim 18 wherein said step of receiving said user defined text messages comprises the step of receiving an Unstructured Supplementary Service Data (USSD) message encapsulating said user-defined text messages from said mobile station.

* * * * *